United States Patent [19]

Brockmueller

[11] Patent Number: 4,518,410
[45] Date of Patent: May 21, 1985

[54] STORING BENDING MOLDS

[75] Inventor: Bernd Brockmueller, Hawkesbury, Canada

[73] Assignee: PPG Industries, Inc., Pittsburgh, Pa.

[21] Appl. No.: 492,854

[22] Filed: May 9, 1983

[51] Int. Cl.³ .......................................... C03B 23/023
[52] U.S. Cl. .................................... 65/106; 65/62; 65/273; 65/287
[58] Field of Search .............. 65/62, 106, 107, 273, 65/287

[56] References Cited

U.S. PATENT DOCUMENTS

| 3,216,811 | 11/1965 | Golightly | 65/107 |
| 4,072,492 | 2/1978 | Castine | 65/107 |
| 4,339,259 | 7/1982 | Paudice et al. | 65/273 X |

Primary Examiner—Arthur Kellogg
Attorney, Agent, or Firm—Andrew C. Siminerio; Edward I. Mates

[57] ABSTRACT

The present invention provides a multi-leveled storage system located immediately above a glass sheet bending lehr. The multi-leveled storage system includes an elevator which enables an operator to transfer empty bending molds in groups from a return conveyor located above the roof of a bending lehr onto any one of several storage levels and to replace the tranferred molds with molds needed to produce a different pattern by transferring the different pattern molds from a selected storage level and to transfer said molds needed for said different pattern onto the return conveyor of the conveyor system used for handling glass sheet bending molds. The present invention also enables an operator to shuffle molds between different storage levels to facilitate future mold exchange operations.

9 Claims, 6 Drawing Figures

STORING BENDING MOLDS

BACKGROUND OF THE INVENTION

1. Field of the Invention

The present invention relates to the storage of molds used to bend glass sheets by the gravity sag method in the fabrication of bent glass windshields and other bent glass articles.

2. Description of Technical Background and Patents of Interest

In the fabrication of laminated bent windshields for automobiles and the like, a tunnel-like bending lehr having a controlled heating pattern is used to heat glass sheets to their shaping temperature while supported on outline-type bending molds. The molds are loaded with a pair of glass sheets at a loading station near one end of the lehr, and move on a main conveyor through the hot lehr where the supported glass sheets are shaped by gravity sagging onto the shape of the outline type bending molds and then are removed from the molds at an unloading station near the exit end of the lehr.

An exit elevator is provided to transfer the empty molds and their support carriages from the vicinity of the unloading station to a return conveyor located immediately above the roof of the bending lehr. The latter extends the entire length of the lehr from an upper position defined by said exit elevator to an upper position defined by a loading station elevator near the entrance of the lehr. The loading station elevator lowers the mold and its support carriage into the vicinity of the loading station at the entrance end of the glass sheet bending lehr and at the beginning of the main lehr conveyor that transports the molds laden with glass sheets. The main lehr conveyor, the return conveyor and the exit and entrance elevators at the ends of the conveyors provide a cyclic conveyor system for moving glass sheet bending molds for a glass sheet bending operation.

Periodically, it becomes necessary to change the production of the glass sheet bending molds from one pattern to another. In the past, this change has required the removal of the molds that were no longer needed to a storage area remote from the bending lehr and the retrieval from said remote storage area to the vicinity of the bending lehr of a new set of bending molds adapted to shape glass sheets into the shape desired for a new pattern. The difficulty of maintaining and transferring molds under such circumstances has been accepted reluctantly in the past. However, the present invention has improved the efficiency of storing and replacing bending molds whenever a pattern change is indicated.

Typical prior art patents showing the mold cycling system of the prior art include U.S. Pat. No. 3,216,811 to James S. Golightly and U.S. Pat. No. 4,072,492 to William A. Castine, Jr. These prior art cycling systems were used with mold storage areas remote from the lehr.

SUMMARY OF THE INVENTION

According to the present invention, a multi-level storage system is provided above the roof of a glass sheet bending lehr, preferably immediately above the return conveyor. In addition, elevator means is provided, preferably in the central portion of the length of the bending lehr, to divide each storage level into two storage areas of substantially equal length. The elevator means is capable of carrying a small group of accumulated molds, preferably up to approximately three, and is constructed and arranged to receive and accumulate a group of molds from the return conveyor, to transfer the accumulated molds to a level aligned with a selected one of the multi-level storage areas that has space available for mold storage and to discharge the accumulated molds into the available space. This enables the elevator means to receive molds for a new pattern from any of the storage areas, to receive and accumulate a group of molds needed to fabricate glass sheets to a new pattern, to move to the level aligned with the return conveyor, and to transfer the new molds onto the return conveyor. If the new molds are stored at a different level from the level that has available storage space, the elevator means may have to transfer to a position aligned with a different storage level before the new molds are discharged from the storage level to the elevator means.

The apparatus also enables the elevator means to shuffle the molds stored among the various levels of storage so as to facilitate removal of molds of a third pattern when future production requirements for the third pattern is indicated.

The various benefits of the present invention will be obvious in the light of a description of a preferred embodiment that follows.

DESCRIPTION OF THE PREFERRED EMBODIMENT

Figure 2:
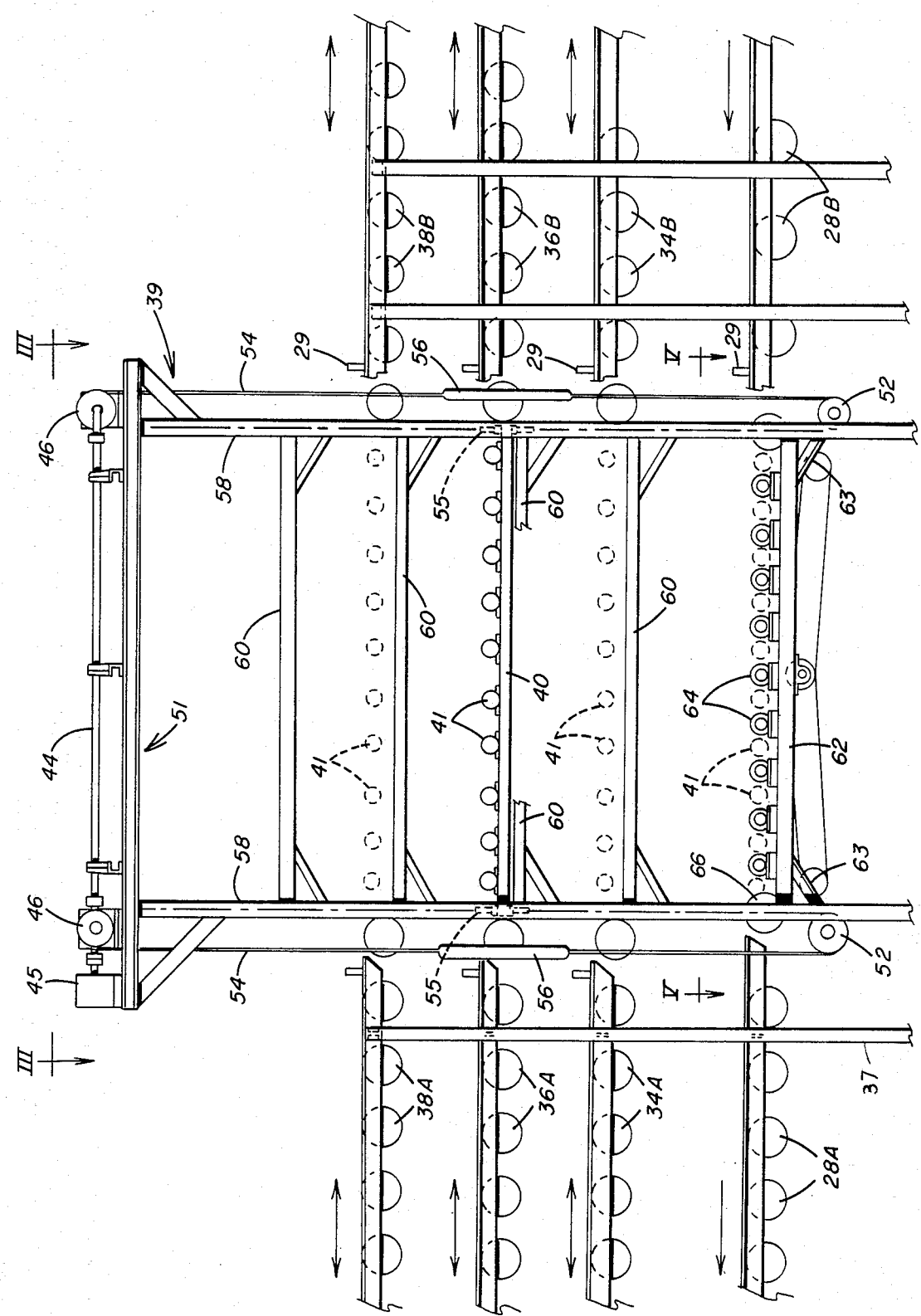
FIG. 2 is an enlarged fragmentary elevational view of a portion of the elevator means forming an important part of the present invention, with parts omitted for clarity, showing its relation to the various storage levels and to the return conveyor of the lehr as it existed prior to the present invention.
Figure 3:
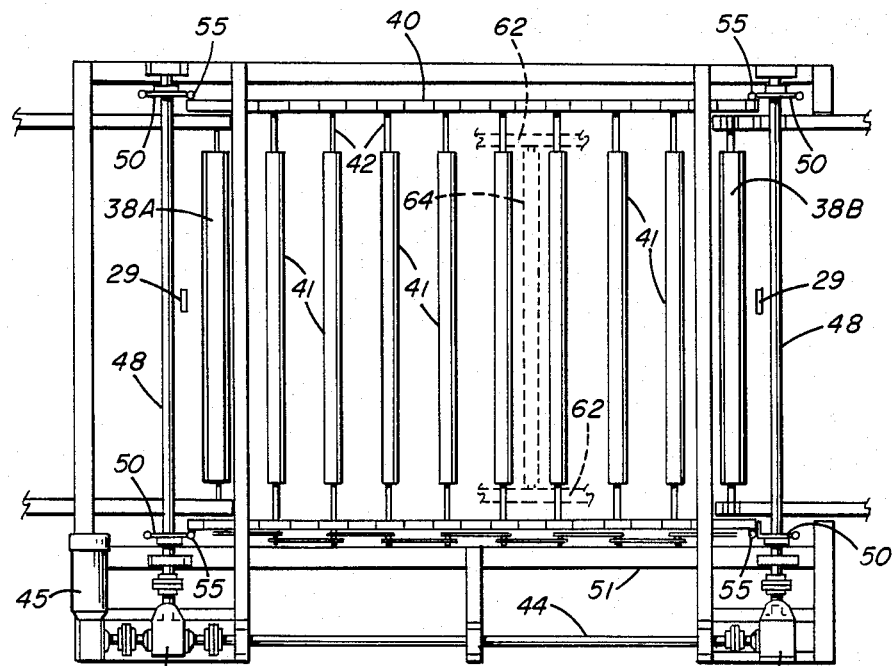
FIG. 3 is a plan view along the line III—III of FIG. 2, of the upper portion of the elevator means forming part of the present invention showing a portion of the preexisting return conveyor system in phantom.

Referring to the drawings, the apparatus comprises an elongated bending lehr 21 comprising a plurality of transversely extending and longitudinally spaced main conveyor rolls 22 that provides a main conveyor extending the full length of the lehr 21 from a loading station 24 at one end of the conveyor to an unloading station 26 at the other end of the conveyor. A return conveyor 28 comprising conveyor rolls 28A and 28B (see FIG. 2) is supported above the roof of the bending lehr 21. A vertically adjustable stop means 29 is provided in the vicinity of the leftmost conveyor roll 28B. The return conveyor 28 extends from an exit elevator 30 located in the vicinity of the unloading station 26 for the purpose of transferring unloaded bending molds from the main conveyor rolls 22 to the return conveyor 28, and a loading station elevator 32 constructed and arranged to return molds from the return conveyor 28 to the main conveyor rolls 22 in the vicinity of the mold loading station 24.

According to the present invention, a first level mold storage means 34 containing rolls 34A and 34B (see FIG. 2), a second level mold storage means 36 comprising rolls 36A and 36B and a third level mold storage means 38 comprising rolls 38A and 38B are supported on an outline support structure 37. The latter straddles the bending lehr 21 including the mold return conveyor 28. Adjustable stop means 29 are provided in the vicinity of each rightmost roll 34A, 36A and 38A and each leftmost roll 34B, 36B and 38B.

Figure 4:
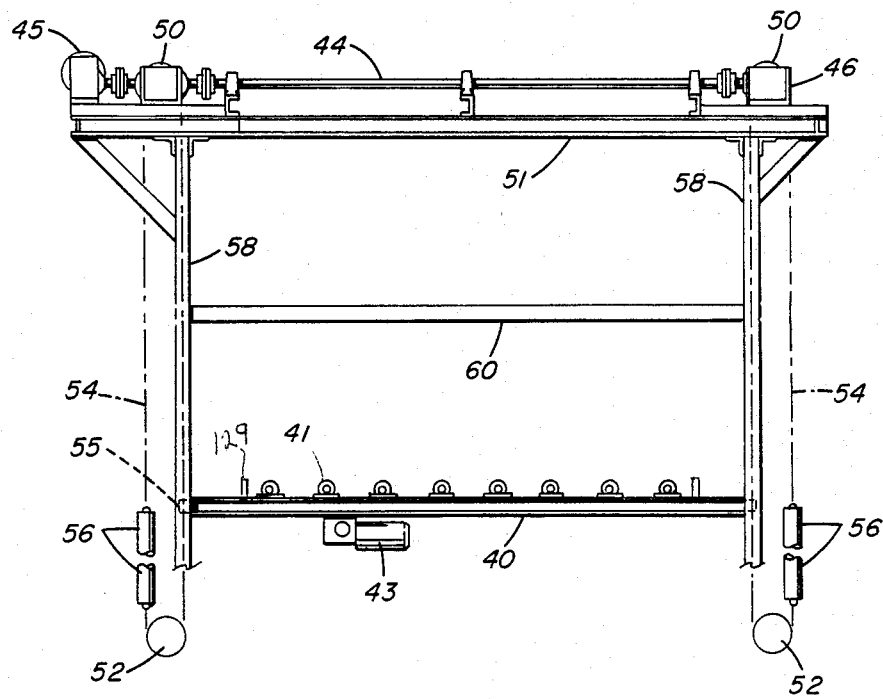
FIG. 4 is a fragmentary elevational view of the upper portion of the elevator means according to this invention, with parts omitted for clarity, showing the operative connections of the elements thereof.

Each of the storage means 34, 36 and 38 is split into two storage areas by providing a space between rolls 34A and 34B, in the central portion of the first level mold storage means, a space between the rolls 36A and 36B in the second level mold storage means 36, and a space between rolls 38A and 38B in the third level mold storage means 38. The spaces are vertically aligned with a space between return conveyor rolls 28A and 28B. An elevator structure 39 containing a vertically movable elevator platform 40 containing platform rolls 41 having end portions 42 of reduced diameter and an actuating motor 43 (FIG. 4) bridges the spaces between rolls 28A and 28B, 34A and 34B, 36A and 36B, and 38A and 38B. To insure that the elevator platform 40 moves between the spaces, the platform is vertically movable.

The elevator platform 40 is moved vertically so that its platform rolls 41 can be aligned between the rolls 34A and 34B of the first level storage means, or rolls 36A and 36B of the second level storage means 36, or the rolls 38A and 38B of the third level storage means 38 or between the rolls 28A and 28B of the return conveyor 28. While three levels of storage means is shown, any number of storage levels suitable for use may be employed depending on the variety of mold patterns required for fabrication during any production period.

A main drive shaft 44 driven by an elevator drive motor 45 operates meshing gears within gear boxes 46 to rotate auxiliary drive shafts 48 which have fixed thereto upper pulleys 50. The drive motor 45 and gear boxes 46 are supported on an upper support structure 51. Lower pulleys 52 are provided to receive vertically extending drive chains 54 entrained between the upper pulleys 50 and the lower pulleys 52. Connecting means 55 attach the inner run of each drive chain 54 to the open elevator platform 40, and counterweights 56 are attached to the outer run of each drive chain to facilitate the vertical movement of the platform 40 relative to the various level storage means.

The upper support structure 51 rests on vertical legs 58 that flank the sidewalls of the lehr 21 at their lower portion. Horizontal legs 59 support the vertical legs 58 to provide a skeleton type frame that encompasses the lehr 21. Horizontal beams 60 interconnect the vertical legs 58 to reinforce the upper support structure 51.

Figure 5:
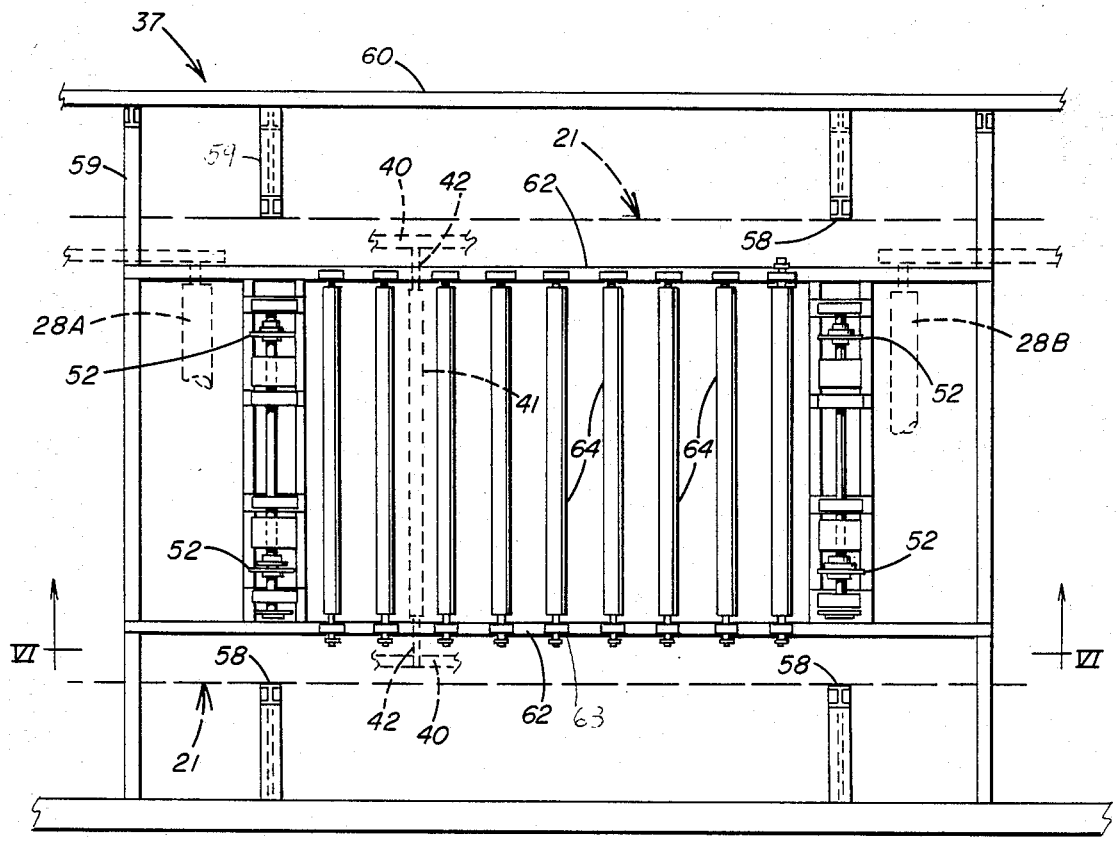
FIG. 5 is a horizontal sectional view of the lower portion of the elevator means taken along the line V—V of FIG. 2, showing, in phantom, its relation to a portion of the return conveyor.
Figure 6:
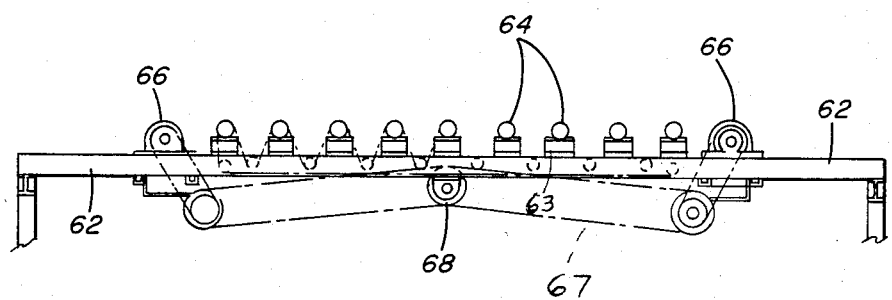
FIG. 6 is an elevational view of a novel bridging portion of the return conveyor of FIG. 5 showing its actuating means.

As seen in FIGS. 5 and 6, a pair of longitudinally extending side bars 62 bridge the space between the support structure for the return conveyor rolls 28A and 28B. The roof of the bending lehr 21 supports the pair of longitudinal side bars 62. The latter support transversely aligned bearing housings 63 in vertical planes spaced between the vertical planes occupied by the vertical paths that the reduced diameter end portions 42 of the platform rolls 41 of the vertically movable elevator platform 40 traverse when the platform 40 is lowered. A plurality of longitudinally spaced bridging rolls 64 is provided between return conveyor rolls 28A and 28B. Each bridging roll extends between a different pair of transversely aligned bearing housings 63. The bridging rolls 64 are driven by drive motors 66 which cause the bridging rolls 64 to rotate in unison in either a clockwise or counter-clockwise direction when actuated by one or the other of two drive motors 66 that cooperate with chain drives 67 and a tension adjustment means 68 to drive the bridging rolls 64 in unison.

Each set of rolls 28A, 28B, 34A, 34B, 36A, 36B, 38A, and 38B is provided with a drive motor (not shown) that operates independently of the standard motor drive system for the main conveyor rolls 22. A cycle for actuating the various stop means 29 and the various sets of rolls in coordination with the operation of the elevator drive motor 45 for the platform 40 may be controlled through the manual operation of various switches or by a control circuit that operates the stop means, the various sets of rolls and the elevator platform drive motor through a system of timers and control interlocks that assure that molds are transferred only during proper circumstances, i.e., when the platform 40 is properly aligned and the area into which a mold transfers is clear to receive the mold supporting carriages to be transferred thereto.

In a normal operation of the bending lehr, glass sheets are loaded in pairs on outline bending molds having ring-like rails conforming to the shape and outline of the glass sheets after bending. Each outline mold in turn is supported on a mold of rectangular outline configuration. The glass sheet laden molds are conveyed in a series through the bending lehr 21 along the main conveyor rolls 22. The temperature within the lehr 21 is so coordinated with the rate of glass sheet movement that when the mold arrives at the unloading station 26, the pair of glass sheets have been heated to the glass softening temperature and have sagged to conform to the outline shaping surface of the mold.

Figure 1:
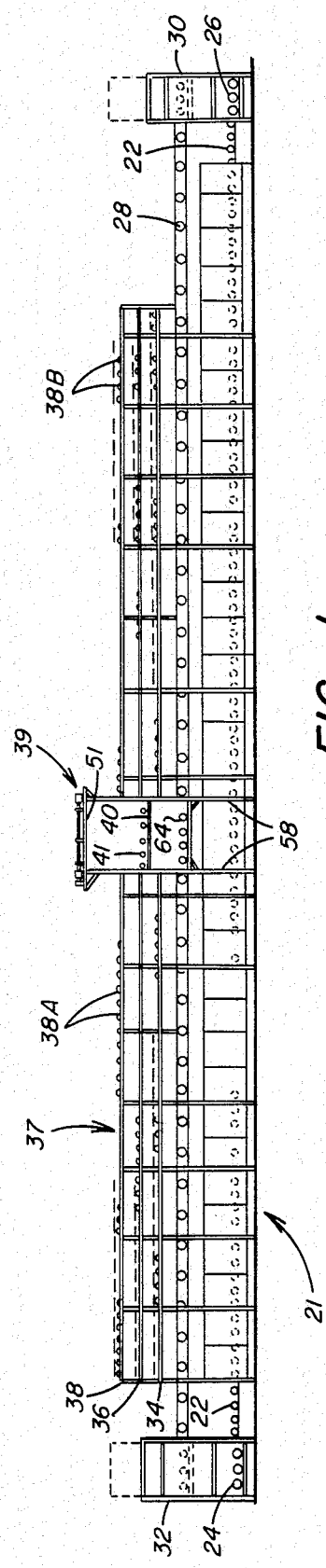
FIG. 1 is a longitudinal elevational view, with parts omitted, of a modified bending lehr containing the mold storage and transfer system of the present invention.

After the bent glass sheets are unloaded from the mold for further processing, each mold and its supporting carriage is lifted on the exit elevator 30 to the return conveyor 28 where the molds, now empty, move with their supporting carriages from right to left as shown in FIG. 1 until they arrive at the loading station elevator 32 and the molds and their supporting carriages are lowered into the loading station 24 where the process is repeated.

Suitable interlocks well known in the art are provided to insure the return conveyor 28 or the loading station elevator 32 do not discharge until such time as sufficient space is provided for clearance. Similar interlock devices may be incorporated with the preferred embodiment of the present invention, or the controls for sequencing the operation of the stop means 29, the rolls in the storage areas at the various storage levels and the elevator platform may be performed manually by an operator. Suitable prearranged programming switches (not shown) may be provided to control a timing mechanism that determines the number of molds to be removed from a storage area, a control is provided to determine which storage level is to be depleted of molds to be brought into the bending cycle conveyor system comprising the main conveyor rolls 22, the exit elevator 30, the return conveyor 28, and the loading station elevator 32, to or from which storage area containing a set of A rolls or a set of B rolls at the selected storage level the molds should be transferred from or to the elevator platform rolls 41.

In a production embodiment of this invention, means is provided for independently actuating each movable stop means 29, for actuating clockwise or counter-clockwise rotation of each set of rolls 34A, 34B, 36A, 36B, 38A, 38B and 41 and elevator drive motor 45.

The dimensions of the elevator platform 40 are such that it is capable of receiving three or less mold supporting carriages of rectangular outline, each of which supports a single mold thereon. A counter provides rotational time to transfer one, two or three molds and carriages at a time for each transfer, depending upon the number of molds needed to effect a production change.

In normal operation, the regular cyclic path of mold carriages is conducted with the carriages in spaced relation from one another along the return conveyor 28, particularly the area containing return conveyor rolls 28B. In a normal operation, the stop means 29 adjacent the downstream return conveyor roll 28B is actuated to engage an oncoming carriage to prevent its movement into the space occupied by the elevator structure 39. The elevator platform 40 is moved to a position of alignment with a storage area at a predetermined level where mold carriages with molds of a new pattern are stored. The motor controlling the storage rolls in the area storing the needed number of newly required carriages in abutting relation is actuated together with a timer or pulse counter to transfer the carriages in a group of one, two, or three as needed in abutting relation onto the platform rolls 41. Stop means 129 are actuated at the downstream end of the elevator platform 40 while other stop means 129 at the other end of the platform 40 adjacent the area being emptied are inactivated to permit the transfer of the carriages onto the elevator platform rolls 41. When transfer of the carriages is completed, the storage rolls in the area being unloaded stop rotating and their associated stop means 29 is actuated to prevent accidental discharge of additional carriages onto the elevator occupying space. The platform 40 is then lowered so that the platform rolls 41 interfit between adjacent bridging rolls 64, the left side stop means 129 are lowered and one of the motors 66 rotates the bridging rolls 64 in a counter-clockwise rotation as seen in the drawings to deliver the group of carriages onto the return conveyor rolls 28A.

At this time, the left stop means 129 are activated and the stop means 29 inactivated and rolls 28B rotated in a counter-clockwise direction to deliver a group of mold supporting carriages containing molds of the previous production pattern onto the elevator platform for a period of time determined by a timer or a counter. The group of one, two or three transferred carriages is then raised with stop means 129 actuated into a position of alignment with an appropriate area at an appropriate storage level.

When the alignment position is reached, stop means 29 at the end of the area to be loaded and the stop means 129 at the unloading end of the elevator platform 40 are inactivated and the motor 43 activated in the proper direction for a time determined by the setting of a timer or pulse counter to transfer the group of abutting carriages onto the storage rolls in the desired area. Stop means 29 is reenergized to prevent carriage movement from the storage area onto the space for the elevator.

The empty platform 40 is again moved to a position of alignment with a storage area containing more of the molds conforming to the new pattern, if their storage area is at a different level from that occupied by the area which received the carriages just unloaded from the platform 40. The cycle is then repeated until a set of molds conforming to the new production pattern has replaced molds for which no present production requirements exist. The step of switching levels is omitted if the area containing molds of a new pattern is at the same level as the area which received the recently discharged molds.

The apparatus of the present invention may also be used simultaneously with a production processing operation in which molds and their supporting carriages move cyclically between the main conveyor rolls 22 and the return conveyor 28 without disturbing the production. Molds and their supporting carriages may be shuffled among areas at various storage levels using techniques similar to those just described for replacing one set of molds for one production pattern with another. The only difference between shuffling and production changing is that the return conveyor is involved with any or all of the storage levels in production changes, whereas only storage levels are involved in shuffling. The latter prepares the storage system for a more efficient transfer of molds of a third pattern and the removal of molds for the new pattern when the production requirements for the new pattern ends and the need to produce bent windshields conforming to a third pattern begins.

The form of the invention shown and described in this disclosure represents an illustrative preferred embodiment. It is understood that various changes such as exchanging the location of said return conveyor with any of said storage levels may be made without departing from the gist of the invention as defined in the claimed subject matter which follows.

I claim:

1. A method of storing molds for bending glass sheets to different patterns comprising establishing a series of vertically spaced, essentially horizontally extending conveyor means defining storage levels above the roof of a tunnel-type bending lehr having an essentially horizontally extending conveyor means for transporting glass sheet bending molds along a heating path extending through the length thereof, providing conveyor means at each of said levels including a return path at one of said levels for returning a set of molds to said heating path, providing elevator means to transfer selected molds of said molds between said return path and one or more of said other levels, transferring molds on said elevator means between said return path and one or more of said levels to store molds of one or more of said patterns at a selected one or more of said storage levels while transferring molds for one or more different patterns from a selected one or more of said storage levels to said return conveyor.

2. A method as in claim 1, wherein said molds are transferred between said return path and said storage levels at approximately the middle of the length of said lehr.

3. A method as in claim 1, further characterized by simultaneously transferring a plurality of molds for one or more patterns from said return path to a selected storage level and alternately simultaneously transferring a plurality of molds for one or more different patterns to said return conveyor.

4. A method as in claim 3, comprising simultaneously transferring three molds as a group between said return conveyor and said other storage levels.

5. Apparatus for storing molds for bending glass sheets delivered along a circulating system comprising a path within a tunnel-type bending lehr extending in an essentially horizontal direction and a return path above said lehr, characterized by a series of vertically spaced, mold storage means extending lengthwise of said tunnel-type bending lehr in essentially horizontal planes at different levels to define storage levels above said lehr, platform means movable vertically between positions of alignment with said return path and selected of said storage levels and elevator means operatively connected to said platform means to move the latter vertically between a position aligned with said return path and a preselected position in alignment with any selected one of said storage levels, whereby said platform means, when empty and aligned with said return path, can be loaded with molds from said return path, can be moved to a position of alignment with any selected one of said storage levels, said molds unloaded from said loaded platform means onto said selected storage level, different molds can be loaded onto said platform means from any one of said storage levels, the loaded movable platform means can be aligned with said return path to unload said different molds onto said return path, and the process repeated until a new set of bending molds replaces the old set of bending molds from the mold circulating system comprising molds travelling along said path through said bending lehr and returning along said return path.

6. Apparatus as in claim 5, wherein said return path comprises a bridging section of longitudinally spaced bridging rolls and said platform means is provided with a plurality of longitudinally spaced conveyor rolls whose positions are staggered relative to the bridging rolls of said bridging section.

7. Apparatus as in claim 5, wherein said platform means is located approximately centrally of the length of said bending lehr and each of said storage levels is split to provide spaced storage areas flanking a central space, said spaces being vertically aligned to enable said platform means to move between said spaces between said storage areas.

8. A method of storing molds for bending glass sheets comprising:
conveying molds on a return conveyor located above the roof of an elongated bending lehr to move said molds from the exit end of said lehr to the entrance end of said lehr;
transferring small groups of said molds from said return conveyor to any of a plurality of storage levels located above said lehr roof and spaced from said return conveyor; and
retaining said molds on any of said storage levels.

9. A method as in claim 8 further including the step of shuffling molds between different storage levels.

* * * * *